United States Patent [19]
Howard et al.

[11] Patent Number: 6,117,408
[45] Date of Patent: Sep. 12, 2000

[54] METHOD OF PRODUCING ZINC BROMIDE

[75] Inventors: Lyle H. Howard, West Memphis; John A. Bain, Hughes, both of Ark.

[73] Assignee: Tetra Technologies, Inc., The Woodlands, Tex.

[21] Appl. No.: 09/342,692

[22] Filed: Jun. 29, 1999

[51] Int. Cl.[7] .................................. C01B 9/04; C01G 9/04
[52] U.S. Cl. ........................... 423/491; 423/50; 423/140; 423/103; 423/109
[58] Field of Search ..................................... 423/103, 109, 423/50, 140, 491

[56] References Cited

U.S. PATENT DOCUMENTS

| | | | |
|---|---|---|---|
| 4,083,942 | 4/1978 | Sanders | 423/497 |
| 4,248,850 | 2/1981 | Keblys | 423/491 |
| 4,290,866 | 9/1981 | Bolton et al. | 423/50 |
| 4,514,374 | 4/1985 | Kirsch | 423/497 |
| 4,572,771 | 2/1986 | Duyvesteyn et al. | 423/140 |
| 5,089,242 | 2/1992 | Dijkhuis et al. | 423/109 |
| 5,208,004 | 5/1993 | Myerson | 423/622 |
| 5,230,879 | 7/1993 | Beaver et al. | 423/491 |
| 5,951,954 | 9/1999 | Fisher et al. | 423/491 |
| 6,036,929 | 3/2000 | Brown et al. | 423/491 |

FOREIGN PATENT DOCUMENTS 882916  11/1981  U.S.S.R. ................................ 423/491

OTHER PUBLICATIONS

Dec. 18, 1997, Method of Manufacturing Clear Brine Fluids from Impure Zinc Feedstock, Ser. No. 08/993,914.

*Primary Examiner*—Ngoc-Yen Nguyen
*Attorney, Agent, or Firm*—Jo Katherine D'Ambrosio

[57] ABSTRACT

A method for producing zinc bromide from zinc hydroxide contaminated with iron and manganese compounds. The method comprises the step of mixing zinc hydroxide feedstock containing metal impurities with a hydrobromic acid comprising elemental bromine in the presence of a reducing agent to produce an impure zinc bromide solution. The metal impurities are removed from the zinc bromide solution in a two-stage process: the first stage comprises the steps of precipitating iron by maintaining the pH within a range of from about 3.6 to 4.15 and filtering out the insoluble iron compounds. The second stage comprises the steps of acidifying the zinc hydroxide solution and adjusting the pH to a range of 3.8 to 4.3 with a alkalinity source from metal oxide, hydroxide or carbonate to precipitate the manganese compounds. The resulting mixture is filtered and concentrated to form a solution comprising zinc bromide essentially free of iron and manganese compounds.

21 Claims, No Drawings

METHOD OF PRODUCING ZINC BROMIDE

FIELD OF THE INVENTION

The present invention relates to a method for preparing zinc bromide from hydrobromic acid comprising elemental bromine and contaminated zinc hydroxide. Particularly, the invention is directed to the removal of iron and manganese impurities from zinc bromide produced from contaminated zinc hydroxide byproduct of electrogalvanzing wastewater.

BACKGROUND OF THE INVENTION

Zinc hydroxide is a by-product of the treatment of electrogalvanizing wastewater. Steel production is one example of an industrial process that uses electrogalvanizing which produces contaminated wastewater that must be processed to separate out pollutants so that the water can be recycled. During the water treatment process, zinc hydroxide slurries and/or filtercakes are formed. Although zinc hydroxide is a useful industrial compound, as a by-product of the electrogalvanizing process, it is contaminated with iron, manganese and other impurities. One industrial use of zinc hydroxide is as a source of zinc in the production of zinc bromides. Purification is required to remove the various impurities before the zinc or zinc hydroxide can be used to make zinc bromide, or else the impurities must be removed from the zinc bromide. The process of purifying the low-grade zinc hydroxide can be both expensive and time consuming. Using recycled zinc hydroxide containing impurities without the benefit of a purification process, however, results in a contaminated end product.

Keblys, U.S. Pat. No. 4,248,850, discloses a process for preparing basic metal bromides comprising contacting in an aqueous medium a basic metal compound and bromine in the presence of formaldehyde as a reducing agent. The '850 reference teaches the use of alkaline earth metal compounds such as calcium carbonate, lime or zinc hydroxide. The example methods disclosed in the '850 patent reference resulted in a pH range of above 5.7. The '850 reference does not teach or suggest how to remove the iron and/or manganese impurities from zinc hydroxide.

A process for producing metal bromides is disclosed in Sanders, U.S. Pat. No. 4,083,942. Alkali and alkaline earth metal bromides may be prepared by reacting a basic compound of an alkali or alkaline earth metal with a reducing agent, formic acid, to form a reaction mixture at a pH of less than 7.0; and thereafter, adding stepwise alternate incremental portions of bromine and the basic compound while maintaining the pH less than 7, preferably using lime as the basic compound.

Beaver et al., U.S. Pat. No. 5,230,879 teaches a process for reducing metal halates to metal halides by reacting a metal halate with a reducing agent in an aqueous alkaline reaction medium having a pH above about 7. Kirsch U.S. Pat. No. 4,514,374 discloses the preparation of metal bromides from alkaline earth metal compounds in the presence of added lower alkanol, preferably methanol, as a reducing agent.

None of the references teach or suggest using zinc hydroxide recovered from electrogalvanizing wastewater that is contaminated with iron and/or manganese to manufacture high purity zinc bromide, nor a method for doing so.

The problem of producing zinc bromine from zinc hydroxide slurries or filtercakes that are byproducts of industrial processes, such as electrogalvanizing wastewater, is that the resulting zinc bromine is contaminated with impurities that prevent it from being marketable. This problem has not been adequately resolved by prior teachings. It is desirable to have a method of producing zinc bromine from contaminated zinc hydroxide that removes iron, manganese and other metal impurities without the release of excess bromine gas.

SUMMARY OF THE INVENTION

Zinc hydroxide slurries and/or filtercakes resulting from the process of electrogalvanizing wastewater or sludge have been used as a less expensive zinc source for producing zinc bromide. The electrogalvanizing wastewater consists of primarily zinc hydroxide but can contain impurities such as iron and manganese. These metal ions create problems in the final product by tinting the solution, and/or slowly precipitating. We have discovered that the iron and manganese impurities can be removed by reacting the zinc hydroxide with bromine in the presence of a reducing agent, at very low pH and the raising of the pH to precipitate out the impurities, followed by sequential acidification and pH elevation to remove any remaining impurities. The pH is critical to make sure that the impurities are precipitated without precipitating the zinc bromide. The process can convert the reducing agent to carbon dioxide without evolving bromine gas.

One preferred method for preparing zinc bromide comprises the steps of:

(a) adding zinc hydroxide contaminated with compounds of iron or manganese or a combination thereof, to an aqueous hydrobromic acid solution in the presence of elemental bromine and a reducing agent to form a first mixture comprising zinc bromide at a final pH at which the zinc bromide is essentially soluble and any iron compounds present are essentially insoluble;

(b) removing from the first mixture from step (a) any precipitated iron compounds;

(c) acidifying the mixture from step (b) with hydrobromic acid in the presence of elemental bromine to convert any manganese compounds to manganese oxides and obtain an acidified mixture;

(d) increasing the pH of the acidified mixture from step (c) with a sufficient alkalinity source from metal oxide, hydroxide or carbonate to obtain a second mixture having a final pH at which the zinc bromide is essentially soluble and any manganese compounds present are essentially insoluble;

(e) removing from the second mixture from step (d) any precipitated manganese compounds to form a solution comprising zinc bromide essentially free of iron and manganese compounds. Preferably, the aqueous hydrobromic acid solution in step (a) initially comprises from 1 to 45 weight percent elemental bromine and from 1.5 to 65 weight percent hydrobromic acid. The hydrobromic acid in step (c) is an aqueous solution initially comprises from 1 to 45 weight percent elemental bromine and from 1.5 to 65 weight percent hydrobromic acid. The zinc hydroxide can be recovered from an electrogalvanizing process. The method can further comprise the step of testing the second mixture from step (d) for the presence of soluble manganese compounds, and if present, repeating steps (c) and (d). Preferably, the solution from step (e) is then concentrated. The reducing agent during this method reacts to form a volatile gas can be selected from formaldehyde, formic acid, ammonia, hydroxy amines, amines and combinations thereof. In one preferred method, the reducing agent is excess stoichiometric formaldehyde.

Preferably, the pH's of the first and second mixtures are maintained below 4.5. In one embodiment, the final pH of the first mixture is from 3.6 to 4.15 and the final pH of the second mixture is from 3.8 to 4.3. The precipitates can be removed in steps (b) and (e) by filtration.

In a preferred method, the alkalinity source from metal oxides, hydroxides or carbonates is selected from calcium oxide, calcium hydroxide, calcium carbonate, zinc oxide and combinations thereof essentially free of iron and manganese compounds.

An alternative method for preparing zinc bromide, comprises the steps of:

(a) adding zinc hydroxide obtained from an electrogalvanizing process and contaminated with compounds of iron and manganese, to an aqueous hydrobromic acid solution comprising elemental bromine in an amount of up to 15 weight percent and excess stoichiometric formaldehyde to form a first mixture comprising zinc bromide and iron oxide precipitate at a final pH from 3.6 to 4.15;

(b) removing the precipitated iron compounds from the first mixture from step (a);

(c) acidifying the mixture from step (b) with an aqueous hydrobromic acid solution comprising elemental bromine in an amount up to 15 percent by weight to convert any manganese compounds to manganese oxides and obtain an acidified mixture;

(d) increasing the pH of the acidified mixture from step (c) with sufficient hydrated lime to obtain a second mixture comprising precipitates of manganese compounds at a final pH of from 3.8 to 4.3;

(e) checking the second mixture from step (d) for the presence of soluble manganese compounds, and if present, repeating steps (c) and (d);

(f) removing the precipitated manganese compounds from the second mixture from step (e) to form a solution comprising zinc bromide essentially free of iron and manganese compounds.

In a preferred method, the final pH of the first mixture in step (a) is from 3.8 to 3.9 and the final pH of the second mixture in step (d) is from 4.0 to 4.1. Preferably, the aqueous hydrobromic acid solutions in steps (a) and (c) comprise from 1.5 to 65 weight percent hydrobromic acid and from 1 to 45 weight percent elemental bromine. The aqueous hydrobromic acid solutions in steps (a) and (c) can comprise from 40 to 50 weight percent hydrobromic acid and from 1 to 8 weight percent elemental bromine. The formaldehyde is present in the aqueous hydrobromic acid solution in step (a) in an amount of about 1.2 stoichiometric equivalents. The final step of this method comprises concentrating the solution from step (f) by evaporation.

DETAILED DESCRIPTION OF THE INVENTION

In the practice of this invention, recycled zinc hydroxide resulting as a byproduct of various industrial processes is used to produce purified zinc bromide for use in drilling fluids, textile treatment, photographic emulsion, etc. In one preferred method, the feedstock sources of zinc hydroxide are byproducts of electrogalvanizing wastewater streams discharged during industrial processes, for example steel production. Although a plentiful and cheap source for zinc hydroxide, these waste products tend to produce a zinc bromide solution having metal impurities such as iron, manganese and other undesirable metals.

During the first stage of a preferred method of this invention, contaminated zinc hydroxide, resulting from the treatment of electrogalvanzing wastewater in the form of a slurry or filtercake, is added to an aqueous solution of hydrobromic acid in the presence of elemental bromine and a reducing agent to form a first mixture. The first mixture comprises zinc bromide at a final pH at which the zinc bromide is essentially soluble and any iron compounds, iron oxides for example, that are present, are insoluble. The iron compounds and manganese compounds found in the zinc hydroxide slurry or filtercake are removed during the filtration stages of this preferred method.

The reducing agent can be selected from formaldehyde, formic acid, ammonia, hydroxy amines, amines and combinations thereof. Preferably, the reducing agent is excess stoichiometric formaldehyde. The reducing agent has a low molecular weight and reacts to form a volatile gas typically carbon dioxide or nitrogen that is released to the atmosphere. The hydrobromic acid is preferably an aqueous solution initially comprising from 1 to 45 weight percent elemental bromine and from about 1.5 to about 65 weight percent hydrobromic acid. The preferred aqueous hydrobromic acid solution comprises from 40 to 50 weight percent and from 1 to 8 weight percent elemental bromine.

Preferably, the hydrobromic acid and elemental bromine are charged first so that the initial pH is zero or less. After charging the reducing agent and contaminated zinc hydroxide, the resulting mixture comprises zinc bromide at a final pH at which the zinc bromide is essentially soluble and the iron compounds present are essentially insoluble. During this first mixing process, the pH is adjusted to within a range of from about 3.5 to about 4.15. In one preferred method, the pH is within a range of from about 3.8 to about 3.9. When this pH range is achieved, the zinc hydroxide feed is discontinued. Maintaining the desired pH range is important during this first mixing process as it is for the entire method. If the pH is too high, zinc can precipitate out with the iron compounds and zinc hydroxide is left in the filtercake or slurry thereby reducing the available zinc for the reaction and therefore, reducing the economic advantage. Also, if too high pH can result in a reaction mixture that is possibly gelatinous. If the pH is too low, the metal impurities remain in a soluble state and will not participate out, which occurs during the next stage of this method.

The initial reaction resulting in the first mixture preferably takes place in a vessel made of corrosion-resistant materials, such as, for example, fiberglass reinforced plastic reaction vessel. A conventional agitator or recirculation system can be used to generally maintain CSTR condition. Although very little bromine gas will evolve under normal operating conditions, a scrubber in communication with a vapor space at the top of the vessel can be used to capture any bromine coming out of solution. The zinc bromide mixture resulting from the first reaction comprises metal impurities of iron compounds and manganese compounds. A two-stage process is used to remove these impurities from the impure zinc bromide solution. In one preferred method, the zinc bromide mixture is piped from the reaction vessel to a filter, such as, for example, a diatomaceous earth filter, for the second stage of this preferred method. During filtration, iron compound impurities, typically in the form of oxide, that easily precipitate out at the resulting pH level, from about 3.6 to about 4.15, preferably from 3.8 to 3.9, are removed.

The third stage of this method takes place in a reaction vessel similar to the first reaction vessel. During the third stage, the zinc bromide mixture, minus the filtered iron compounds, is acidified with additional hydrobromic acid in the presence of elemental bromine to obtain an acidified mixture and convert any manganese compounds to manganese oxides. The pH of the acidified mixture is then increased with sufficient alkalinity source from metal oxide, hydroxide or carbonate to obtain a second mixture having a final pH at which the zinc bromide is essentially soluble and any manganese compounds present are essentially insoluble. The alkalinity source from metal oxides, hydroxides or carbonates can comprise calcium oxide, calcium hydroxide, calcium carbonate or zinc oxide and combinations thereof that are essentially free of iron and manganese compounds. An alkalinity source for use with one preferred method can be alkaline earth and base metal oxides, hydroxides and carbonates. The final pH of the second mixture is within a range from about 3.8 to about 4.3. Preferably, the final pH of the second mixture is from about 4.0 to about 4.1. The pH range during this stage of the preferred method is also critical. A zinc bromide solution with a pH range that is too low will not precipitate the manganese compounds. Also, higher pH can result in the undesirable precipitation of zinc compounds.

The second mixture can be tested to check for the presence of soluble manganese compounds. If soluble manganese compounds are found, the mixture is acidified again with additional hydrobromic acid in the presence of elemental bromine and the pH of the acidified mixture increased with sufficient alkalinity source from metal oxide, hydroxide or carbonate. The tolerable soluble manganese level is generally less than 10 ppm. The final pH of the preferred solution is from 4.0 to 4.1. The hydrobromic acid added during this third stage is preferably an aqueous solution initially comprising from 1 to 45 weight percent elemental bromine and from about 1.5 to about 65 weight percent hydrobromic acid. The preferred aqueous hydrobromic acid solution comprises from 40 to 50 weight percent and from 1 to 8 weight percent elemental bromine.

The step of testing for the presence of soluble manganese compounds and acidifying with hydrobromic acid/elemental bromine solution is repeated until the concentration of the remaining soluble manganese compounds are at a tolerable level. The formaldehyde reducing agent is first converted to formic acid during the first stage of the method of this invention and the resulting formic acid oxidized to carbon dioxide and released through the scrubber during this third stage. When the soluble manganese compounds are reduced to the desired range, the zinc bromide solution is sent to a second filter to filter out the insoluble manganese and the manganese precipitates are removed from the zinc bromide solution, preferably by filtration. The resulting solution comprises zinc bromide essentially free of iron and manganese compounds. Preferably, the pH range during all stages of the method is maintained at less than 4.5.

After the precipitates are filtered out, the zinc bromide solution can be concentrated. The concentrated zinc bromide solution comprises about 50 to 60 weight percent zinc bromide, and about 17 to 25 weight percent calcium bromide. Preferably, the concentrated zinc bromide solution comprises about 55 weight percent zinc bromide and about 21 weight percent calcium bromide. The final product after concentration comprises less than 30 ppm soluble iron, and, preferably, about 10 to 15 ppm soluble manganese. The solution can be concentrated by evaporation. This is conveniently accomplished in a direct fired evaporator. Alternatively, a single or multiple effect vacuum evaporator can be used to concentrate the zinc bromide solution.

The reactions occurring during the method of this invention are exothermic reactions. The upper range of heat tolerated by the materials of construction of the reaction vessel limits the temperature during the preferred method. For FRP vessels, the upper margin for safety is generally about 210° F. The temperature for FRP vessels is preferably maintained below 150° F. to reduce the loss of bromine. Controlling the feed rate of the zinc hydroxide into the hydrobromic acid in the initial step helps to maintain the desired temperature ranges.

EXAMPLE

EQUIPMENT

Two 12,000 gal. fiberglass reinforced plastic reaction vessels, each equipped with a conventional agitator, a bromine scrubber, and, 1 gallon defoamer pot, two diatomaceous earth filters, and a direct fired evaporator.

CHEMICALS

Zinc hydroxide slurry obtained as a byproduct of electrogalvanizing operations containing 28 weight percent zinc, 1 weight percent iron and 600 ppm manganese, Red acid comprising 48 weight percent hydrobromic acid and 5.7 weight percent bromine Formaldehyde solution, 37 weight percent, Hydrated lime.

The process was a batch process.

PROCESS

Reaction Tank 1

1. 82,944 pounds of red acid was added to reaction tank 1.
2. 780 lbs. of the formaldehyde solution was added to the reaction.
3. 66,649 lbs. of the zinc hydroxide slurry was added to the red acid/formaldehyde mixture in a controlled reaction so that the reaction temperature did not exceed 210° F., until the pH was 3.99.

Diesel was added as needed from the defoamer pot to counteract foaming.

The mixture was piped through the filter to remove insoluble iron oxides, to a second reaction tank.

Reaction Tank 2

1. The filtrate from the filter of first reaction tank was acidified in the reaction tank by charging 6,008 pounds red acid. Diesel was added as needed from the defoamer pot to counteract foaming.
2. 1300 lb. hydrated lime were added to adjust the pH to 4.05.
3. The second mixture in Reaction Tank 2 was tested for the presence of soluble manganese and it was determined to contain less than 15 ppm manganese.
4. The second mixture was piped through the second filter and insoluble manganese oxide was filtered out.
5. The filtered second mixture was piped to an evaporator and concentrated. The product contained about 55 weight percent zinc bromide, about 21.4 weight percent calcium bromide and about less than 20 ppm manganese.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claim is:

1. A method for preparing zinc bromide, comprising the steps of:

(a) adding zinc hydroxide contaminated with compounds of iron or manganese or a combination thereof, to an aqueous hydrobromic acid solution in the presence of elemental bromine and a reducing agent to form a first mixture comprising zinc bromide at a final pH at which the zinc bromide is essentially soluble and any iron compounds present are essentially insoluble precipitates;

(b) removing from the first mixture from step (a) any precipitated iron compounds;

(c) acidifying the remaining mixture from step (b) with hydrobromic acid in the presence of elemental bromine to convert any manganese compounds to manganese oxides and obtain an acidified mixture;

(d) increasing the pH of the acidified mixture from step (c) with sufficient alkalinity source from metal oxide, hydroxide or carbonate to obtain a second mixture having a final pH at which the zinc bromide is essentially soluble and any manganese oxides present are essentially insoluble precipitates;

(e) removing from the second mixture from step (d) any precipitated manganese oxides to form a solution comprising zinc bromide essentially free of iron compounds and manganese oxides.

2. The method of claim 1 wherein the aqueous hydrobromic acid solution in step (a) initially comprises from 1 to 45 weight percent elemental bromine and from 1.5 to 65 weight percent hydrobromic acid.

3. The method of claim 1 wherein the hydrobromic acid in step (c) is an aqueous solution initially comprising from 1 to 45 weight percent elemental bromine and from 1.5 to 65 weight percent hydrobromic acid.

4. The method of claim 1 wherein the zinc hydroxide is recovered from an electrogalvanizing process.

5. The method of claim 1 further comprising the step of testing the second mixture from step (d) for the presence of soluble manganese compounds, and if present, repeating steps (c) and (d).

6. The method of claim 1 further comprising the step of concentrating the solution from step (e).

7. The method of claim 1 wherein the reducing agent is converted to a volatile gas.

8. The method of claim 1 wherein the reducing agent is selected from formaldehyde, formic acid, ammonia, hydroxy amines, amines or combinations thereof.

9. The method of claim 1 wherein the reducing agent is excess stoichiometric formaldehyde.

10. The method of claim 1 wherein the pH's of the first and second mixtures are maintained below 4.5.

11. The method of claim 1 wherein the final pH of the first mixture is from 3.6 to 4.15.

12. The method of claim 1 wherein the final pH of the second mixture is from 3.8 to 4.3.

13. The method of claim 1 wherein the precipitates are removed in steps (b) and (e) by filtration.

14. The method of claim 1 wherein the alkalinity source from metal oxides, hydroxides or carbonates is selected from calcium oxide, calcium hydroxide, calcium carbonate, zinc oxide and combinations thereof essentially free of iron and manganese compounds.

15. A method for preparing zinc bromide, comprising the steps of:

(a) adding zinc hydroxide obtained from an electrogalvanizing process and contaminated with compounds of iron and manganese, to an aqueous hydrobromic acid solution comprising in an amount up to 45 percent by weight of elemental bromine and excess stoichiometric formaldehyde to form a first mixture comprising zinc bromide and iron oxide precipitate at a final pH from 3.6 to 4.15;

(b) removing the iron oxide precipitate from the first mixture from step (a);

(c) acidifying the remaining mixture from step (b) with an aqueous hydrobromic acid solution comprising in an amount up to 45 percent by weight of elemental bromine to convert any manganese compounds to manganese oxides and obtain an acidified mixture;

(d) increasing the pH of the acidified mixture from step (c) with sufficient hydrated lime to obtain a second mixture comprising precipitated manganese oxides at a final pH of from 3.8 to 4.3;

(e) checking the second mixture from step (d) for the presence of soluble manganese oxides, and if present, repeating steps (c) and (d);

(f) removing the precipitated manganese compounds from the second mixture from step (e) to form a solution comprising zinc bromide essentially free of iron oxides and manganese oxides.

16. The method of claim 15 wherein the final pH of the first mixture in step (a) is from 3.8 to 3.9.

17. The method of claim 15 wherein the final pH of the second mixture in step (d) is from 4.0 to 4.1.

18. The method of claim 15 wherein the aqueous hydrobromic acid solutions in steps (a) and (c) comprise from 1.5 to 65 weight percent hydrobromic acid and from 1 to 45 weight percent elemental bromine.

19. The method of claim 18 wherein the aqueous hydrobromic acid solutions in steps (a) and (c) comprise from 40 to 50 weight percent hydrobromic acid and from 1 to 8 weight percent elemental bromine.

20. The method of claim 15 further comprising the step of concentrating the solution from step (f) by evaporation.

21. The method of claim 15 wherein the formaldehyde is present in the aqueous hydrobromic acid solution in step (a) in an amount of about 1.2 stoichiometric equivalents.

* * * * *

UNITED STATES PATENT AND TRADEMARK OFFICE
CERTIFICATE OF CORRECTION

PATENT NO. : 6,117,408
DATED : June 29, 1999
INVENTOR(S) : Lyle H. Howard et al.

Page 1 of 1

It is certified that error appears in the above-identified patent and that said Letters Patent is hereby corrected as shown below:

<u>Title page,</u>
Item [75], add Mr. David J. Hanlon as a co-inventor of U.S. Patent 6,117,408.

Signed and Sealed this

Twenty-third Day of October, 2001

Attest:

*Nicholas P. Godici*

NICHOLAS P. GODICI
*Attesting Officer*      *Acting Director of the United States Patent and Trademark Office*